US011748020B2

(12) United States Patent
Nazari et al.

(10) Patent No.: US 11,748,020 B2
(45) Date of Patent: Sep. 5, 2023

(54) REESTABLISHING REDUNDANCY IN REDUNDANT STORAGE

(71) Applicant: Nebulon, Inc., Fremont, CA (US)

(72) Inventors: Siamak Nazari, Mountain View, CA (US); Jin Wang, Cupertino, CA (US); Jonathan McDowell, Belfast (GB); Srinivasa D. Murthy, Cupertino, CA (US)

(73) Assignee: Nebuon, Inc., Fremont, CA (US)

( * ) Notice: Subject to any disclaimer, the term of this patent is extended or adjusted under 35 U.S.C. 154(b) by 0 days.

(21) Appl. No.: 17/802,791

(22) PCT Filed: Feb. 26, 2021

(86) PCT No.: PCT/US2021/020003
§ 371 (c)(1),
(2) Date: Aug. 26, 2022

(87) PCT Pub. No.: WO2021/174065
PCT Pub. Date: Sep. 2, 2021

(65) Prior Publication Data
US 2023/0104473 A1 Apr. 6, 2023

Related U.S. Application Data

(60) Provisional application No. 62/983,475, filed on Feb. 28, 2020.

(51) Int. Cl.
G06F 3/06 (2006.01)

(52) U.S. Cl.
CPC ............ *G06F 3/065* (2013.01); *G06F 3/0613* (2013.01); *G06F 3/0665* (2013.01); *G06F 3/0679* (2013.01)

(58) Field of Classification Search
CPC ...... G06F 3/065; G06F 3/0613; G06F 3/0665; G06F 3/0679
(Continued)

(56) References Cited

U.S. PATENT DOCUMENTS 8,805,786 B1 8/2014 Nantanzon
2004/0153727 A1 8/2004 Hicken et al.
(Continued)

OTHER PUBLICATIONS

Crump, "Backup, Replication and Snapshot—When to Use Which?" Jan. 25, 2017, Retrieved on Apr. 19, 2021 from https://storageswiss.com/2017/01/25/backup-replication-and snapshot/.
(Continued)

Primary Examiner — Than Nguyen
(74) Attorney, Agent, or Firm — David Millers

(57) ABSTRACT

Storage redundancy may be resynchronized without determining a snapshot difference. A storage component (210) owning a volume (122) can maintain current and expected generation numbers (212, 214) based on modification requests received and modification requests that a backup component (220) acknowledges completing. The backup (220) can maintain current and expected generation numbers (222, 224) based on modification requests received and applied to a backup volume (124). If either component (210, 220) fails and later returns to service, differences between the owner's current and expected generation numbers (212, 214) and the backup's current and expected generation numbers (222, 224) indicate which modification requests may have been missed and need to be reconstructed to restore synchronization.

13 Claims, 5 Drawing Sheets

(58) Field of Classification Search
USPC .................................................. 711/154, 161
See application file for complete search history.

(56) References Cited

U.S. PATENT DOCUMENTS

| 2012/0054152 | A1  | 3/2012 | Adkins et al. |                      |
|--------------|-----|--------|---------------|----------------------|
| 2013/0138909 | A1* | 5/2013 | Yoshida       | G06F 3/0689          |
|              |     |        |               | 711/E12.002          |
| 2015/0046645 | A1* | 2/2015 | Iwanaga       | G06F 3/061           |
|              |     |        |               | 711/111              |
| 2015/0248240 | A1* | 9/2015 | Condict       | H04L 69/04           |
|              |     |        |               | 711/162              |
| 2016/0018991 | A1  | 1/2016 | Flynn et al.  |                      |
| 2019/0236161 | A1* | 8/2019 | Roy           | G06F 3/0608          |
| 2020/0150876 | A1* | 5/2020 | Messing       | G06F 12/0246         |
| 2021/0224161 | A1  | 7/2021 | Wang et al.   |                      |
| 2021/0224236 | A1  | 7/2021 | Wang et al.   |                      |

OTHER PUBLICATIONS

Serra, "Redundancy Options in Azure Blob Storage" Nov. 5, 2015, Retrieved on Apr. 19, 2021 https://www.iamesserra.com/archive/2015/11/redundancy-options-in-azure-blob-storage/.

* cited by examiner

REESTABLISHING REDUNDANCY IN REDUNDANT STORAGE

BACKGROUND

Many storage systems provide redundancy to cope with failures. Such redundancy is often achieved by replicating stored data, i.e., storing the same data in multiple locations. Data in a storage system are typically organized in volumes, e.g., virtual volumes, with each volume being known to client systems, so that client systems logically read data from and write data to the volumes. Storage systems track where data for the virtual volumes is physically stored, and storage systems providing redundancy for fault tolerance purposes replicate the volume data in different physical storage. One way for a storage system to replicate volume data uses a primary storage system and a backup storage system. In such a system, clients normally issue IO requests for a given volume to the primary storage system, but if the primary storage fails or is unavailable, clients may instead issue such IO requests to the backup storage system. In such a scenario, the primary storage system may be responsible for updating the backup storage system with any data that the primary system receives for writing to a given volume.

In general, either the primary or the backup storage system may fail at any time. If the primary storage system fails, the backup storage system may become the primary storage system and take over IO responsibilities for volumes that the failed storage had provided. If the backup fails, the primary may continue to be responsible for IO for the volumes but without concurrently backing up data. In either failure scenario, a storage system may operate without redundancy until the failed system resumes normal function. When the failed system returns to service, the returning system may assume a backup role but may have missed data changes that the primary storage system completed while the returning system was unavailable. In this case, the backup system then needs to update the backup data. Once the backup storage system for a volume has data identical to the data the primary storage system has for the volume, full redundancy has been reestablished, and both the primary and backup storage systems can replicate new data changes.

Some traditional solutions for reestablishing redundancy involve taking snapshots of the volume on the primary system after the failure of the redundant storage system and determining a difference between that snapshot and a later snapshot taken when the redundant storage system returns to service. The difference indicates which data the backup storage system needs to backup to reestablish redundancy. Determining data differences between snapshots can be time consuming particularly when the storage capacity of a volume is large. Efficient systems and methods are needed for reestablishing redundancy for replicated storage volumes after a storage processor failure.

BRIEF DESCRIPTION OF THE DRAWINGS

FIG. 3-1 is a flow diagram of a process that a primary storage component in accordance with an example of the present disclosure performs upon receiving a modification request.

FIG. 3-2 is a flow diagram of a process that a backup storage component in accordance with an example of the present disclosure performs upon receiving a modification request forwarded from the primary storage component.

FIG. 3-3 is a flow diagram of a process that a primary storage component in accordance with an example of the present disclosure performs upon receiving an acknowledgement from the backup storage component.

FIGS. 4-1, 4-2, and 4-3 are block diagrams illustrating states of a storage platform when processing an example modification request.

The drawings illustrate examples for the purpose of explanation and are not of the invention itself. Use of the same reference symbols in different figures indicates similar or identical items.

DETAILED DESCRIPTION

Figure 1:
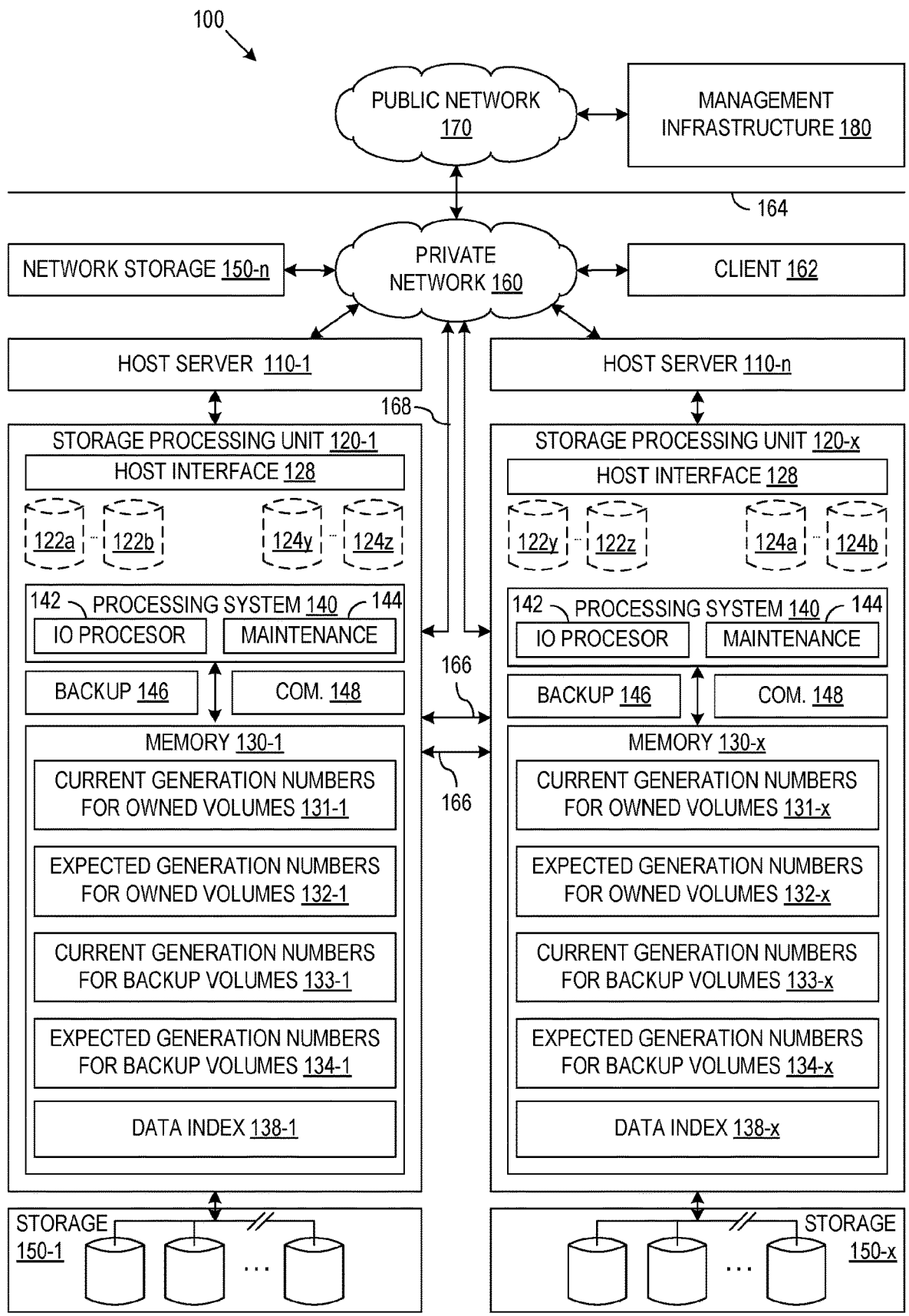
FIG. 1 is a block diagram illustrating an architecture including a storage platform in accordance with one example of the present disclosure.

Storage systems and methods in accordance with specific examples of the present disclosure may resynchronize redundant storage, i.e., reestablish redundancy, without taking snapshots or calculating a snapshot difference. Such systems and methods may particularly use a sequence of generation numbers that uniquely identify modification requests and indicate the order of modification requests. A primary storage component that owns a volume can record resynchronization data including a set of generation numbers to identify which modification requests a backup storage component has acknowledged as being backed up, and the backup storage system can similarly record resynchronization data including generation numbers that identify which modification requests the backup storage component has processed. If either storage component fails and subsequently returns, the storage components can use the resynchronization data to determine which modification requests are needed to resynchronize a backup volume with a primary volume, and the primary storage component can reconstruct and send the need modification requests to the backup storage component.

In one specific example, a storage platform includes multiple storage components and assigns volumes of storage to the storage components. The storage component to which a volume is assigned is sometimes referred to as the owner of the volume or as the primary storage component for the volume, and the storage component that owns a volume normally performs IO requests, e.g., writes and reads, associated with the volume. The storage platform may also assign another of the storage components as a backup storage component that is responsible for retaining a copy of data of the volume. During normal operation of the storage platform, all modification requests associated with a volume or a storage location in the volume, e.g., a volume ID and an offset, are sent to the primary storage component for the volume, which associates or assigns respective generation numbers from a monotonically increasing sequence of generation numbers respectively with the modification request. The modification request are generally IO requests of specific types (e.g., write, unmap, xcopy, write-same, and createsnapshot instructions) that modify stored data. As a result, each IO request that changes data in a volume may be uniquely identified and distinguished by the generation number of the IO request. The primary storage component and the backup storage component use generation numbers in databases for storage functions such as tracking where data corresponding to volumes are physically stored. The primary and backup storage components also use the generation numbers to record which IO requests were stored in the primary and backup volumes.

In accordance with a further aspect of the current disclosure, the primary storage component and the backup storage component for a volume may independently record two generation number values, sometimes referred to as the current generation number and the expected generation number. When the primary storage component and the backup storage component are synchronized, the current generation number and expected generation number of the primary storage component respectively match the current generation number and expected generation number of the backup storage component. During operation, however, the values of current generation number and the expected generation number in the primary storage component and the backup storage component may differ, for example, when the backup storage component has not completed backup of all of IO requests that the primary storage component has completed. When the primary or backup storage component fails or otherwise becomes unavailable, the functioning storage component acts as the owner of the volume, and the current generation number in the available storage component may become increasingly different from the current generation number in the unavailable storage component. When the storage component later returns, persistent values of the current and expected generation numbers in the returned storage component may be used in a process that resynchronizes backup storage data for the volume.

FIG. 1 is a block diagram including a storage platform 100 in accordance with one example of the present disclosure. Storage platform 100 includes one or more host servers 110-1 to 110-n, which are generically referred to herein as host server(s) 110. Each host server 110 may be a conventional computer or other computing system including a central processing unit (CPU), memory, and interfaces for connections to internal or external devices. One or more storage processing units (SPUs) 120-1 to 120-x, which are generically referred to herein as SPU(s) 120, are installed in host servers 110. In general, storage platform 100 may include one or more host server 110. For redundancy, storage platform 100 includes at least two host servers 110 or at least at least two storage processing units 120, but more generally, a limitless number of different configurations are possible containing any number of host servers 110 and any number of SPUs 120.

Each SPU 120 may provide storage services to the host servers 110 or clients 162 via virtual volumes. FIG. 1 particularly shows SPU 120-1 provides storage services relating to a set of virtual volumes 122a to 122b and shows SPU 120-x provides storage services relating to virtual volumes 122y to 122z. SPU 120-1 is sometimes referred to as "owning" volumes 122a to 122b in that SPU 120-1 is normally responsible for fulfilling IO requests that are directed at any of volumes 122a to 122b. Similarly, SPU 120-x owns volumes 122y to 122z in that SPU 120-x is normally responsible for executing IO requests that are directed at any of volumes 122y to 122z. The virtual volumes, e.g., volumes 122a to 122b and 122y to 122z, in FIG. 1 are generically referred to herein as volume(s) 122 or primary volume(s) 122. Each SPU 120 controls assigned backend storage for local storage data corresponding to volumes 122 that the SPU 120 owns. Additionally, each SPU 120 may maintain a set of one or more backup volumes that correspond to virtual volumes 122 owned by one or more other SPUs 120. In the example of FIG. 1, SPU 120-1 maintains backup volumes 124y to 124z that are intended to copy virtual volumes 122y to 122z that SPU 120-x owns, and SPU 120-x maintains backup volumes 124a to 124b that are intended to copy virtual volumes 122a to 122b that SPU 120-1 owns. One or more backup volumes 124a to 124b and 124y to 124z of FIG. 1 are generically referred to herein as backup volume(s) 124. As described further below, backup volumes 124 may be virtual volumes that are generally copies of respective virtual volumes 122 but may be incomplete copies to the extent that the owner SPU 120 may have completed one or more IO requests that the backup SPU 120 has not yet completed.

Each SPU 120 controls or uses its physical storage 150, e.g., storage 150-1 and 150-x respectively for SPUs 120-1 and 150-x in FIG. 1, to store the data associated with virtual volumes 122 and backup volumes 124. Storage 150 may be installed devices in the same host server 110 as an associated SPU 120, may include one or more external storage devices directly connected to its associate SPU 120, or network-accessible storage devices 150-n. Storage 150 may employ, for example, hard disk drives, solid state drives, or other nonvolatile storage devices or media in which data may be physically stored, and storage 150 particularly may have a redundant array of independent disks (RAID) 5 or 6 configuration for performance and redundancy.

Each SPU 120 includes memory 130 and a processing system 140. Memory 130 may provide general purpose memory for processes that processing system 140 executes and may particularly store a data index 138 for tracking where data corresponding to its volumes 122 and 124 are physically stored in its backend media 150. More specifically SPUs 120-1 to 120-x have respective data indexes 138-1 to 138-x, generically referred to as data indexes 138, to track where data is physically stored. Each data index 138 may, for example, be a key-value store in which each entry has a key including a volume ID of a target virtual volume, an offset in the target virtual volume, and a generation number for an 1O request that wrote to that offset in the target virtual volume. The value in each entry indicates a physical location in storage 150 when the write data of the IO request is stored.

Processing system 140 may include one or more processors or processing cores to execute software or firmware to implement an IO processor 142 and a maintenance module 144. IO processor 142 may be used to process IO requests such as reads and writes to virtual volumes 122 owed by the SPU 120, and maintenance module 144 may perform operations such as garbage collection to ensure that the associated physical storage 150, data index 138, and other resources of the SPU 120 are efficiently used and maintained. More generally, SPUs 120 may provide storage services and functionality such as write and read (TO) operations, compression, deduplication, encryption, mirroring, remote and local access to data, disaster recovery and local and/or cloud backup. U.S. patent application Ser. No. 16/748,454, entitled "Efficient IO Processing in a Storage System with Instant Snapshot, Xcopy, and Unmap Capabilities," filed Jan. 21, 2020, and U.S. patent application Ser. No. 16/783,035, entitled "Primary Storage with Deduplication," filed Feb. 5, 2020 further describe some implementations of the data services that SPU's 120 may provide and are hereby incorporated by reference in their entirety.

Multiple SPUs 120, e.g., SPU 120-1 to 120-x in FIG. 1, may be connected together using high speed data links 166, e.g., one or more parallel 25 GB/s Ethernet links, to form a data network for a set of associated SPUs 120 sometimes referred to herein as a pod of SPUs. Each SPU 120 may further employ a link 168 to connect to a local network 160 that is also connected hosts 110 and client stations 162. Each client station 162 may be a computer including a processor, memory, and software or firmware for executing a user interface adapted to communicate over local network 160. Client stations 162 in general may be storage clients that use storage services that storage platform 100 provides. FIG. 1 further shows that local network 160 may provide a connection through a firewall 164 to a public or wide area network 170, e.g., the Internet, so that SPUs 120 may be remotely accessed, for example, by a cloud-based management infrastructure 180.

Storage platform 100, in one specific implementation of the present disclosure, provides an interface that exposes the virtual volumes 122 to storage operations such as writing and reading of blocks or pages of data at virtual locations in volumes 122. For example, SPUs 120 may present storage volumes 122 to host servers 110 via SCSI (small computer system interface) target, NVMe (nonvolatile memory express) virtual target, or other data interface. The locally installed storage 150 may provide the physical storage of data patterns of data written to virtual volumes 122. As previously noted, storage 150 may include storage devices, e.g., HDDs, SSDs or NVM, installed in the host server 110, connected through an interface (e.g., a RAID card) of the host server 110, or connected directly to the SPU 120. In some implementations, each storage device providing physical storage 150 is only visible to the local SPU 120. In particular, the CPUs, OS, firmware, and baseboard management controllers (BMCs) of host servers 110 are not able to see or directly access some or all of storage 150. Host servers 110 and clients 162 may instead request data services on the virtual volumes 122 owned by SPUs 120.

A read or write request may identify a storage location by a volume number (also referred to as a volume ID) of a virtual volume 122 and an offset to a starting location of affected data in the identified virtual volume 122. A client 162 may send an IO request directed at a virtual volume 122 to a host 110 or directly to the SPU 120 that owns the virtual volume 122. In some examples of the present disclosure, the SPU 120 that owns the target volume 122 tags modification requests with generation numbers. In particular, an IO processor 142 in an SPU 120 that receives and processes a modification request updates, e.g., increments, a current generation number kept for the target volume 122 and assigns the incremented value as the generation number of the modification request. As a result, different modification requests (whether to the same or different virtual locations in a volume 122) are easily distinguishable. In an exemplary implementation, each SPU 120 maintains in memory 130 a current generation number and an expected generation number for each volume 122 that the SPU 120 owns. In the example of FIG. 1, SPU 120-1 records current generation numbers 131-1 and expected generation numbers 132-1 for the virtual volumes 122a to 122b in a persistent, non-volatile portion of its memory 130-1, and SPU 120-x records current generation numbers 131-x and expected generation numbers 132-x for the virtual volumes 122y to 122z in a persistent, non-volatile portion of its memory 130-x. Each current generation number 131-1 or 131-x corresponds to the generation number that was assigned to the last IO request changing data in the volume 122 associated with the generation number, and each expected generation number 132-1 or 132-x corresponds to a generation number such that all IO requests with generation number lower than that number have been completed on both the primary and backup and have been acknowledge to the client requesting the 10. Typically, upon receiving a modification request to a target volume 122, the SPU 120 that owns the target volume 122 increments the current generation numbers associated with the targeted volume and assigns the current generation number to the request, and the SPU 120 owning the target volume may update the expected generation number for the target volume in response to acknowledgments from the SPU 120 that is the backup storage components of the target volume.

Each SPU 120 may also record in its memory 130 a current generation number 133 and an expected generation number for each backup volume 124 that the SPU 120 maintains. In the example of FIG. 1, SPU 120-1 records current generation numbers 133-1 and expected generation numbers 134-1 for the backup volumes 124y to 124z, and SPU 120-x records current generation numbers 133-x and expected generation numbers 134-x for the backup volumes 124a to 124b. As described further below, an SPU 120 receiving a forwarded IO request for a backup volume 124 updates its current generation number 133 upon applying an IO request having a generation number greater than the value of the current generation number 133 for the backup volume 124 and update its expected generation number 134 for a backup volume 124 upon applying an IO request having a generation number equal to the expected generation number 134 for the backup volume 124.

Figure 2:
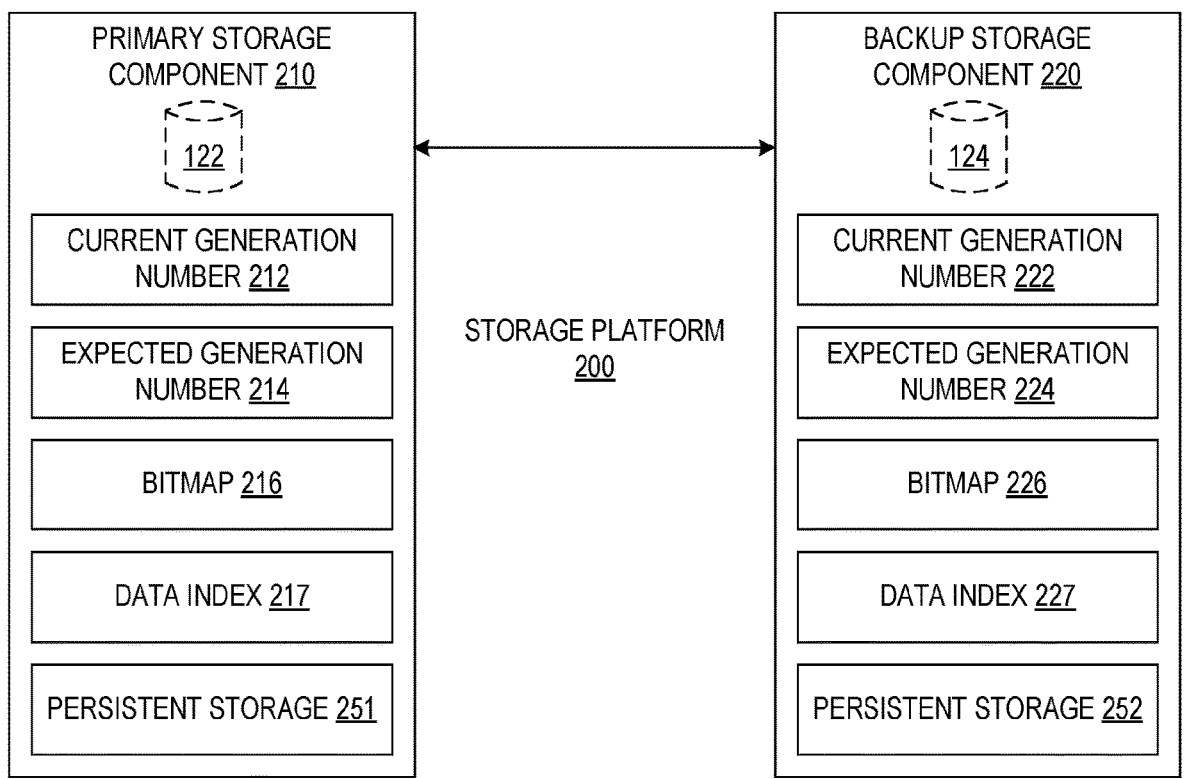
FIG. 2 is a block diagram illustrating a storage platform including a primary storage component and a backup storage component in accordance with one example of the present disclosure.

FIG. 2 illustrates a storage platform 200 in accordance with another example of the present disclosure including a primary storage component 210 that owns a virtual volume 122 and a backup storage component 212 that maintains a backup volume 124 that mirrors volume 122. In general, each storage components 210 and 220 may include an SPU with backend storage and may own or maintain multiple primary and/or backup volumes as described above with reference to FIG. 1. FIG. 2 shows just virtual volume 122 and backup volume 124 for ease of description.

Primary storage component 210 owns primary volume 122 and keeps metadata including a current generation number 212, an expected generation number 214, a bitmap 216, and a data index 217 for primary volume 122. Backup storage component 220 maintains backup volume 124 and keeps metadata including a current generation number 222, an expected generation number 224, a bitmap 226, and a data index 227 for backup volume 124. Current generation number 212 is the generation number of the last modification request that primary storage component 210 started, and expected generation number 214 is next generation number after the highest generation number that both primary storage component 210 and backup storage component 220 acknowledged. More generally, storage component 210 may maintain a sequence window, e.g., a current generation number and an expected generation number, for each volume family, e.g., each writable volume and its read-only snapshots together, that storage component 210 owns.

Backup storage component 220 similarly represents a sequence window using current generation number 222 and expected generation number 224. Current generation number 222 and expected generation number 224 respectively hold the same values as current generation number 212 and expected generation number 214 in primary component 220 when volumes 122 and 124 are synchronized, but at other times, current generation number 222 and expected generation number 224 may differ from current generation number 212 and expected generation number 214 in primary storage component 210 as described further below.

Each storage component 210 or 220, in the example of FIG. 2, further includes a bitmap 216 or 226 identifying the generation numbers of IO requests that storage component 210 or 220 have completed, i.e., recorded in persistent storage 251 or 252. (Persistent storage 251 or 252 may include backend media and/or a non-volatile memory or buffer in which data is stored for subsequent writing to the backend media.) Bitmap 216 in primary storage component 210 generally tracks generation numbers which primary storage component 210 knows have completed on both the owner and backup storage component, while bitmap 226 in backup storage component 220 tracks generation numbers that have completed on the backup storage component 220. In particular, bits in bitmap 216 may respectively correspond to generation numbers in the sequence window of primary storage component 210, and each bit is set or not to indicate whether data from the corresponding IO request has been saved in persistent storage 251. Bits of bitmap 226 corresponds to generation numbers and are set or not to indicate the generation numbers of IO requests that backup storage component 220 applied, e.g., saved in persistent storage 252 and acknowledged to primary storage component 210. In some implementations, the information provided by bitmap 216 or 226 may be derived from data index 217 or 227. In some other implementations, data may first be saved to persistent storage 251 or 252 and acknowledged before a block from persistent storage 251 or 252, e.g., data corresponding to several write operations, is stored in backend storage. In which case, a combination of persistent storage 251 or 252 and data index 217 or 227 can be used to derive bitmap 216 or 226. In either case, bitmaps 216 and 229 may not strictly be required, but use of bitmaps 216 and 217 as described further below may provide faster operations of storage components 210 and 220.

Data indexes 217 and 227 indicate where data of primary volume 122 and backup volume 124 are stored in physical storage. In particular, data index 217 or 227 may be a database of key-value entries. In each entry, the key represents a generation number of an IO request and a virtual volume location where the IO request wrote data, and the value represents where the data is physically stored. Reading the data corresponding to a virtual volume location (or to an IO request) may thus be completed by finding the entry in data index 217 having a key corresponding to the last write (or to the last modification request) targeted at the virtual volume location and then reading from the physical location indicated in the data index entry found. As described further below, a resynchronization process may use the data index 217 to reconstruct IO requests that may be needed for resynchronization.

Figures 1, 3:
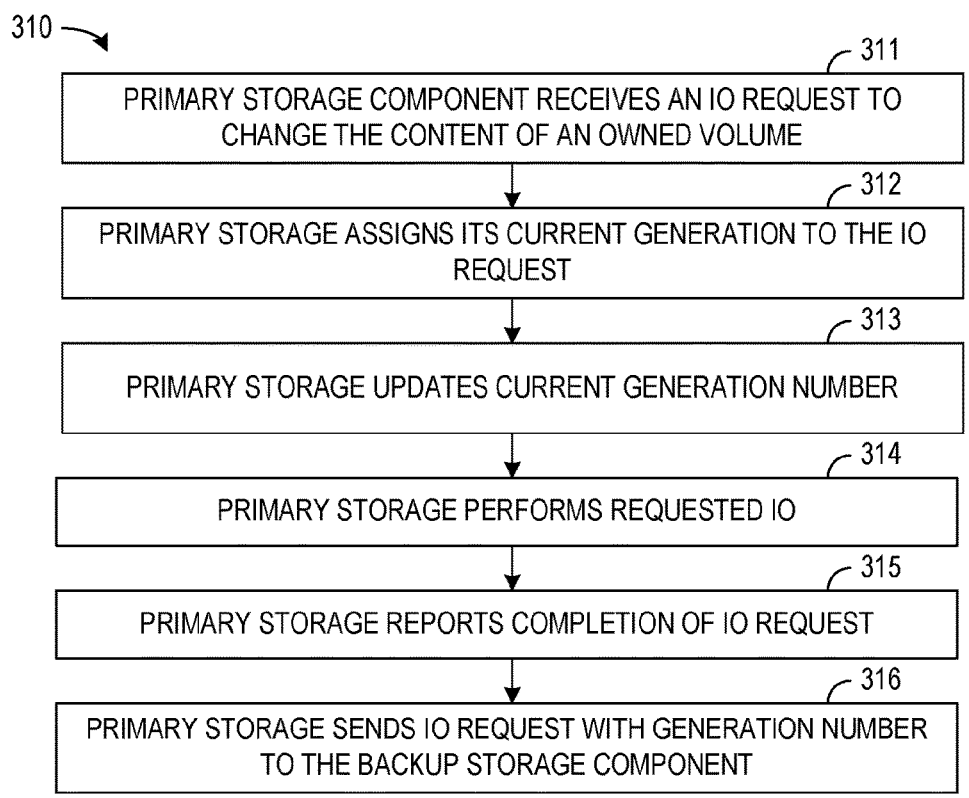
Figures 2, 3:
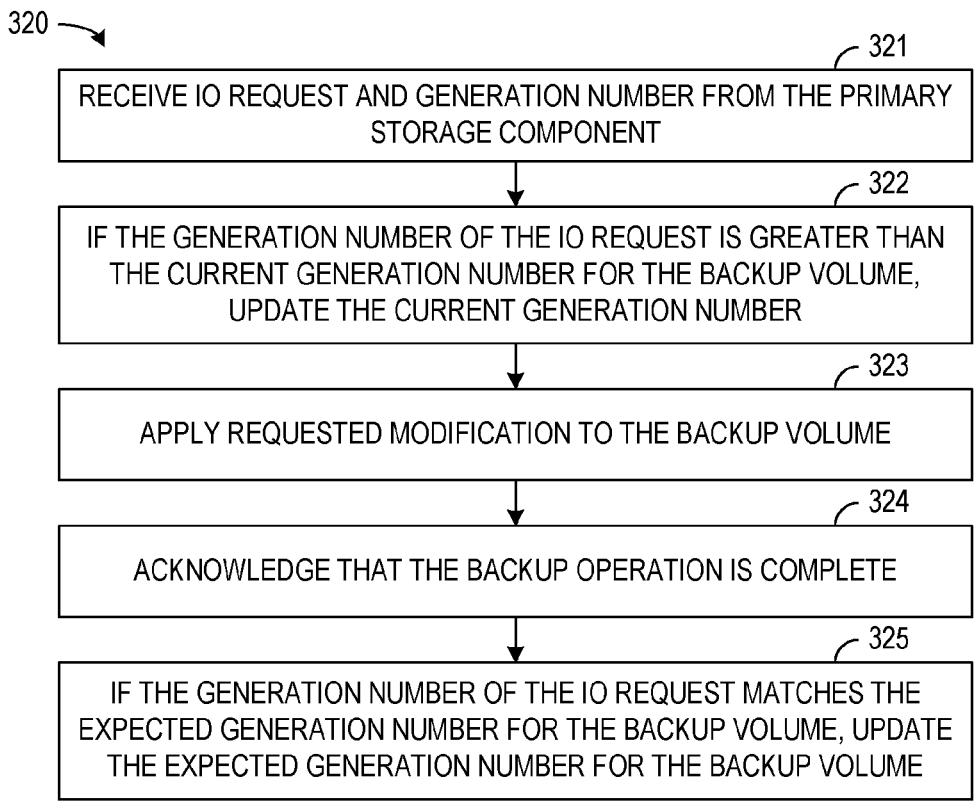
Figure 3:
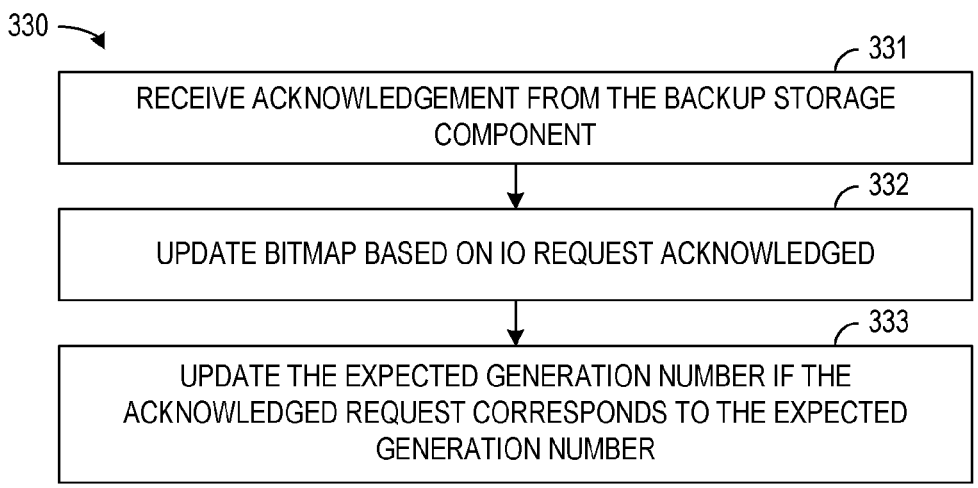

FIG. 3-1 is a flow diagram of a process 310 that a primary storage component may employ when processing an IO request, e.g., a write request from a storage client, that modifies data in a virtual volume that the primary storage component owns and that is mirrored in a backup storage component. To provide a specific example, process 310 is described with reference to storage platform 200 of FIG. 2 where primary volume 122 owned by storage component 210 is mirrored by backup volume 124, which storage component 220 maintains. Method 310 may, of course, be employed in the same or similar manner in other storage platforms. During normal operation of storage platform 200, all IO requests associated with volume 122 or a storage location, e.g., a volume ID and an offset, in volume 122 are sent to primary storage component 210, and primary storage component 210 in block 311 receives an IO request to modify the content of owned volume 122.

Primary storage component 210, in process block 312, assigns to the IO request a unique generation number from a monotonically increasing sequence of generation numbers, e.g., an ordered sequence such as the sequence of consecutive integers. In particular, primary storage component 210 in performing process block 312 may increment the value of current generation number 212 and assign the incremented value to the newly received IO request. In a process block 313, primary storage component 210 updates its current generation number 212, e.g., increments the current generation number for the volume family that the IO request targets. Primary storage component 210, in a process block 314, applies the IO request, e.g., stores data locally in persistent storage 251 to be flushed eventually to backend storage and updates data index 217, and then, in a process block 315, reports completion of the IO operation, e.g., completion is reported locally so that bitmap 216 is updated. (When backup 220 also reports completion, primary storage component 210 may report completion to the storage client.) In a process block 316, the primary storage component 210 sends a copy of the IO request with the assigned generation number to backup storage component 220.

In response to a series IO requests modifying volume 122, primary storage component 210 may repeatedly perform process 310 and increment current generation number 212 for the owned volume 122 and repeatedly forward the IO requests to the backup storage component 220. Since primary and backup storage components 210 and 220 generally operate asynchronously and since IO requests may be communicated through a network, backup storage component 220 may receive IO requests from primary storage component 210 in any order. Accordingly, backup storage component 220 may also process IO requests from primary storage component 210 in any order.

FIG. 3-2 is a flow diagram of a process 320 that backup storage component 220 of FIG. 2 may employ when processing a forwarded IO request, e.g., a write request, that changed data in the virtual volume 122 owned by primary storage component 210. In a process block 321, backup storage component 220 receives the IO request with the generation number from primary storage component 210, and backup storage component 220, in a process block 322, updates its current generation number 222 for backup volume 124 if the generation number of the IO request is larger than any previously-seen generation number for volume 124. Backup storage component 220 in a process block 323 applies the requested IO on backup volume 124, e.g., persists the data in persistent storage 252 and updates bitmap 226. To update bitmap 226, backup storage component 220 may set the bit in bitmap 226 corresponding the generation number of the IO request to indicate that the IO request was applied. When the data is written to backend media, backup storage component 220 updates data index 227, e.g., creates an entry in data index 227 mapping the generation number and the target location in virtual volume 124 to a physical location of the written data in the backend media. Backup storage component 220, in a process block 324, send an acknowledgement of the IO request to primary storage component 210. Backup storage component 220 in a process block 325 updates its expected generation number 224 for volume 124 if the acknowledged IO request has a generation number matching expected generation number 224 of backup volume 124. The update in process block 325 increases generation number 224 to the next generation number that has not been applied. The update may, for example, scan bitmap 226 to find the first unset bit and then set expected generation number 224 to the generation number corresponding to that bit.

The backup storage component 220 generally sends acknowledgements of IO requests to primary storage component 210 as backup storage component 220 completes backup of the IO requests. As a result, primary storage component 210 may receive acknowledgements from backup storage component 220 in any order. FIG. 3-3 is a flow diagram of a process 330 that primary storage 210 may perform when receiving an acknowledgement. Primary storage component 210 receives the acknowledgement in a process block 331 and then, in block 332, updates bitmap 216, e.g., sets a bit corresponding to the acknowledged generation number in bitmap 216. In a process block 333, primary storage component 210 updates expected generation number 214, if the IO request with the expected generation number was acknowledged. This update may based on first unset bit in bitmap 216. Alternatively, the update of expected generation number 214 more specifically sets (or keeps) expected generation number 314 at a value equal to the generation number of the first not yet acknowledged IO request. In general, expected generation 214 is always the lowest unseen generation number, so if all IO requests have completed, expected generation number 214 is updated to one greater than the highest acknowledged IO request.

Figures 1, 4:
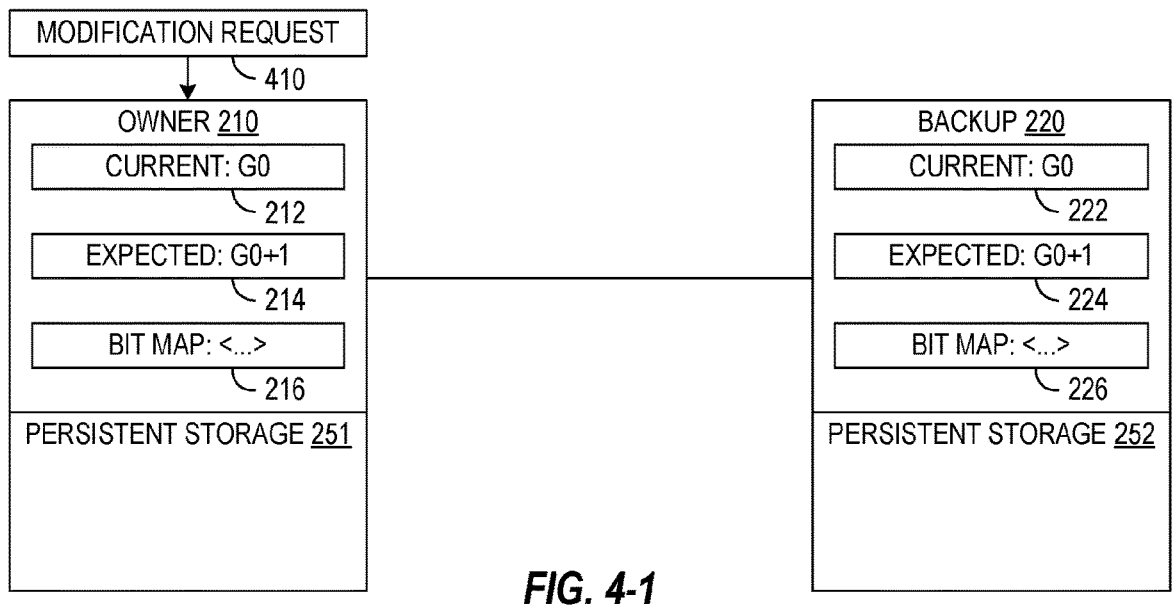
Figures 2, 4:
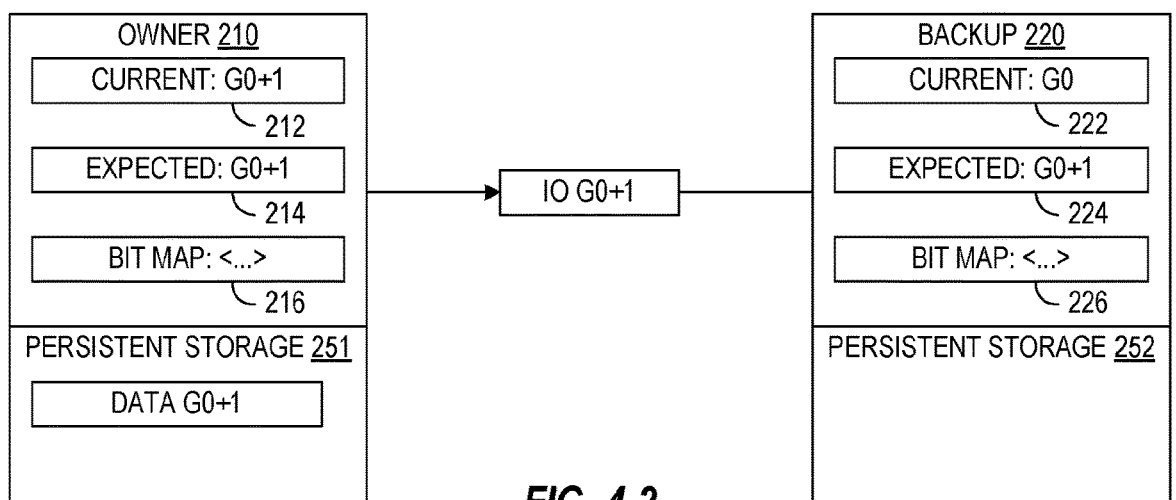
Figures 3, 4:
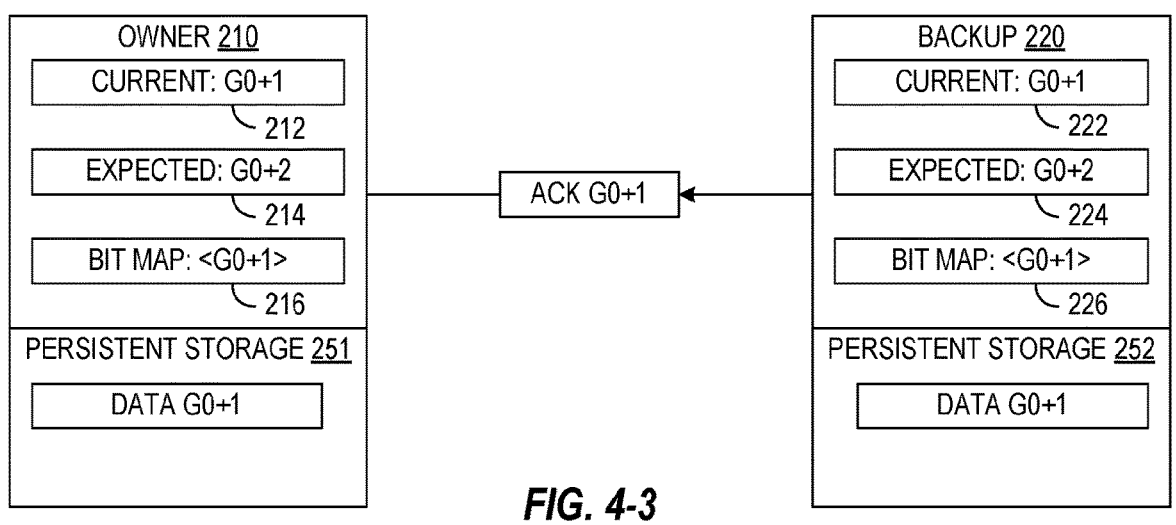

FIGS. 4-1, 4-2, and 4-3 illustrate states of storage platform 200 of FIG. 2 when processing a modification request requiring backup. FIG. 4-1 shows the state of storage platform 200 when primary storage component 210 receives a modification request 410 directed to an owned volume. Initially, a backup of the volume is synchronized, and in primary storage component 210 and backup storage component 220, their current generation numbers 212 and 222 for the volume family have a value G0, and their expected generation numbers 214 and 224 for the volume family have a value G0+1. In response to the IO request, primary storage component 210 assigns generation number G0+1 to the IO request, applies the modification locally, e.g., commits data from the IO request to non-volatile storage 251, and sends the IO request with generation number G0+1 to backup storage component 220 as shown in FIG. 4-2. In general, committing data to persistent storage 251 on primary storage component 210 and sending the IO request to backup storage component 220 may happen in parallel, and not sequentially. At this time, primary storage component 210 also sets its current generation number 212 to G0+1.

Backup storage component 220, upon receiving the IO request with generation number G0+1, applies the IO request e.g., persists the IO data in non-volatile storage 252, sets current generation number 222 to value G0+1, updates bitmap 226 by setting the bit that corresponds to generation number G0+1, and sends an acknowledgement of IO request G0+1 back to primary storage component 210 as shown in FIG. 4-3. Since the generation number G0+1 of the acknowledged IO request was equal to the value of expected generation number 224, backup storage component 220 also updates expected generation number 224 to G0+2. Primary storage component 210 after applying IO request G0+1 locally and receiving the acknowledgement of IO request G0+1 from backup storage component 220, sets expected generation number 214 to G0+2 and updates bitmap 216 by setting the bit that corresponds to generation number G0+1. At that time, the primary and backup volumes are again synchronized, and both primary storage component 210 and backup storage component 220 have current/expected generation numbers set to G0+1/G0+2 for the volume family.

A primary storage component may receive multiple IO requests at the same time (or in a short period of time) targeted at the same owned volume, resulting the primary storage component forwarding one or more IO requests to a backup storage component before receiving acknowledgements of prior IO requests. These IO requests may be sent to the backup storage component in parallel or sequentially, but network transmission (or other factors) may cause the copied IO requests to be seen and applied by the backup storage component in any order. Similarly, the primary storage component can receive and process acknowledgements from the backup storage component in any order.

Figure 5:
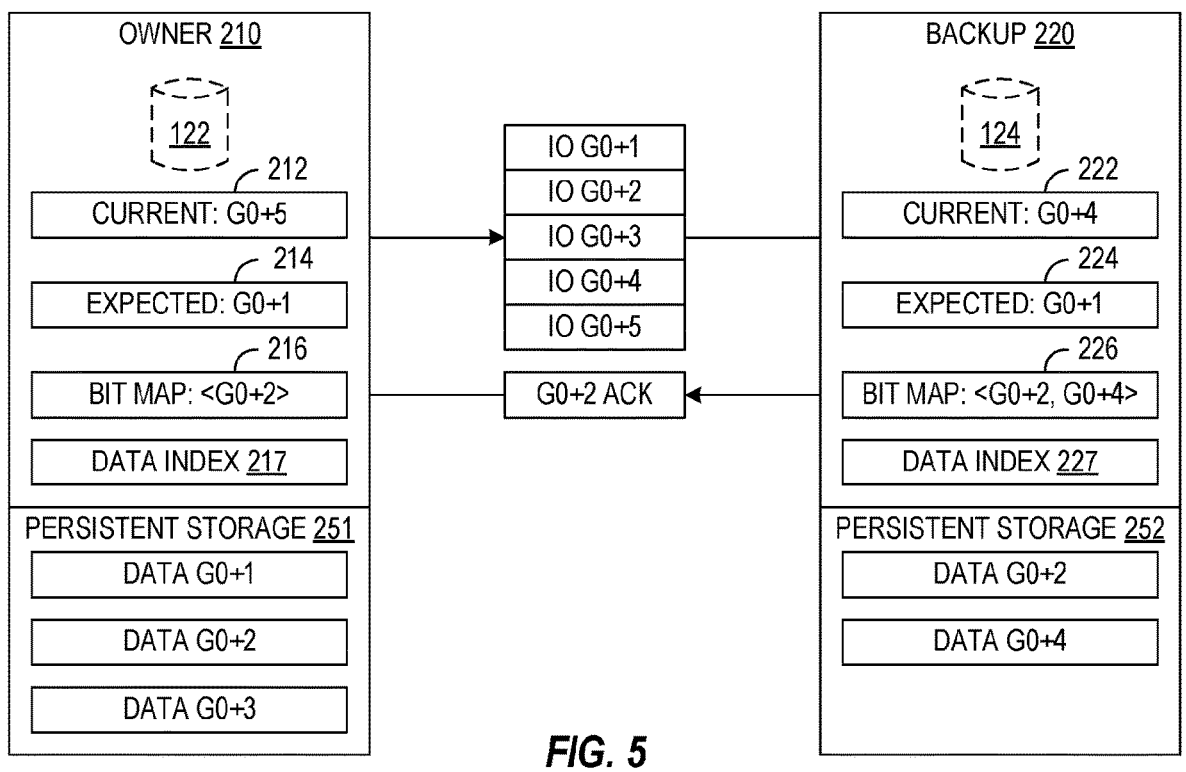
FIG. 5 is block diagrams illustrating a state of the storage platform when processing a series of modification requests.

FIG. 5 illustrates a state of storage platform 200 after primary storage system 210 received five IO requests that change the content of owned volume 122. In the illustrated example, primary storage component 210 and backup storage component 220 started in sync with current generation numbers 212 and 222 having value G0 and expected generation numbers 214 and 224 having value G0+1. Owner 210 upon receiving the five IO requests increments current generation number 212 five times to G0+5 and sends five IO requests corresponding to generation numbers G0+1, G0+2, G0+3, G0+4, and G0+5 to backup storage component 220. In the illustrated example, primary storage component 210 locally completes G0+1, G0+2, and G0+3. In the illustrated example, backup storage component 220 saw and applied the IO requests corresponding to generation numbers G0+2 and G0+4, but owner 210, so far in FIG. 5, has only seen the acknowledgement of IO request G0+2 from backup storage component 220. Acknowledgement for G0+4 may be in flight from backup storage component 220 to primary storage component 210 or may not yet have been sent.

In the state of FIG. 5, primary storage component 210 has current generation number 212 equal to G0+5 (meaning next IO will get gen G0+6) and has expected generation number 214 equal to G0+1 (meaning oldest IO request completed locally but not remotely, i.e., still unacknowledged, has generation number G0+1). Owner 210 also has bitmap 216 showing IO request G0+2 as having completed locally and remotely. On backup storage component 220, current generation number 222 is G0+4 (which is the largest generation number backup storage component 220 has seen) and has expected generation number 224 equal to G0+1 (which is the lowest unseen generation number). Backup bitmap 226 shows IO requests G0+2 and G0+4 as having completed.

Primary storage component 210 can recognize a failure of backup storage component 220 if backup storage component 220 stops acknowledging replications of IO requests, e.g., if the current generation number 212 exceeds expected generation number 214 by a threshold difference, or if primary storage component 210 encounters errors when sending requests to backup storage component 220. Other mechanisms (such as cluster membership protocols in a storage platform including multiple storage components) can detect failure of backup storage component 220 and inform primary storage component 210 of the failure. If backup storage component 220 fails, primary storage component 210 may stop sending copies of IO requests to backup storage component 220, e.g., may skip process block 314 in process 310 of FIG. 3-1, and may process IO requests locally only and keep incrementing values of current and expected generation numbers 212 and 214.

If the primary storage component 210 fails, backup storage component 220 may complete any pending backup IO requests and assume the role of the primary storage component for volume 122. In general, storage components in the storage platform may use cluster membership protocols to detect and report on the failure of any member. Upon detection of failure of primary storage component 210, backup storage component 220 may initiate a process for taking over ownership of volume 122. For example, if primary storage component 210 fails, data stored for backup volume 124 may be made accessible as the data of primary volume 122, and the storage platform recognizes storage component 220 as owner of the primary volume 122. Failed storage component 210 may then be considered a failed backup storage component.

A failed backup storage component, when returning to service, may contact the primary storage component of the backed-up volume to reestablish redundancy. In particular, each storage component may keep its expected generation number in persistent or non-volatile memory, so that when the other storage component fails and returns, the value of the expected generation number that the returning storage component has for the backed-up volume is still available, and the returning storage component may report its last valid expected generation number to the current owner of the volume. At that time, the owner may pause IO and send its current and expected generation number values to the restored (now backup) storage component and also the generation numbers associated with any snapshots that were created between current and the last valid expected generation numbers of the backup storage component. The backup storage component may then set its current and expected generation numbers to match the owner's values. The backup storage component may also create snapshots with the given generation numbers. When the backup storage component informs the owner that the values of its current and expected generation numbers match the values of the current and expect generation number that the owner has, the owner resumes IO and starts replicating all further IO requests. The backup storage component then starts a background resynchronization process, whereby the backup storage component asks the owner to send any data the owner has applied between the last valid expected generation number. The owner can send such data in multiple batches, and the backup storage component may apply such data to its backend storage. When the backup storage component has fully caught up with IO requests that the owner processed while the backup storage component was unavailable, the owner and backup storage component declare the volume has reestablished redundancy.

The state of storage platform 200 shown in FIG. 5 is an example of a state that platform 200 may have when backup storage component 220 fails, and primary storage component 210 declares backup storage component 220 dead. When primary storage component 210 declares backup storage component 220 dead, primary storage component 210 saves expected generation number 214 in persistent storage. In the example state of FIG. 5, that will be G0+1. From the state shown in FIG. 5, primary storage component 210 completes IO requests G0+4 and G0+5 locally and continues to operate normally except that primary storage component 210 stops forwarding further IO transfers to backup storage component 220. Current and expected generation number 212 and 214 keep increasing as primary storage component 210 continues to handle IO transfers to the owned volume 122. Backup storage component 220, which failed, has value G0+1 for last valid expected generation number 224 saved in its persistent memory.

Figure 6:
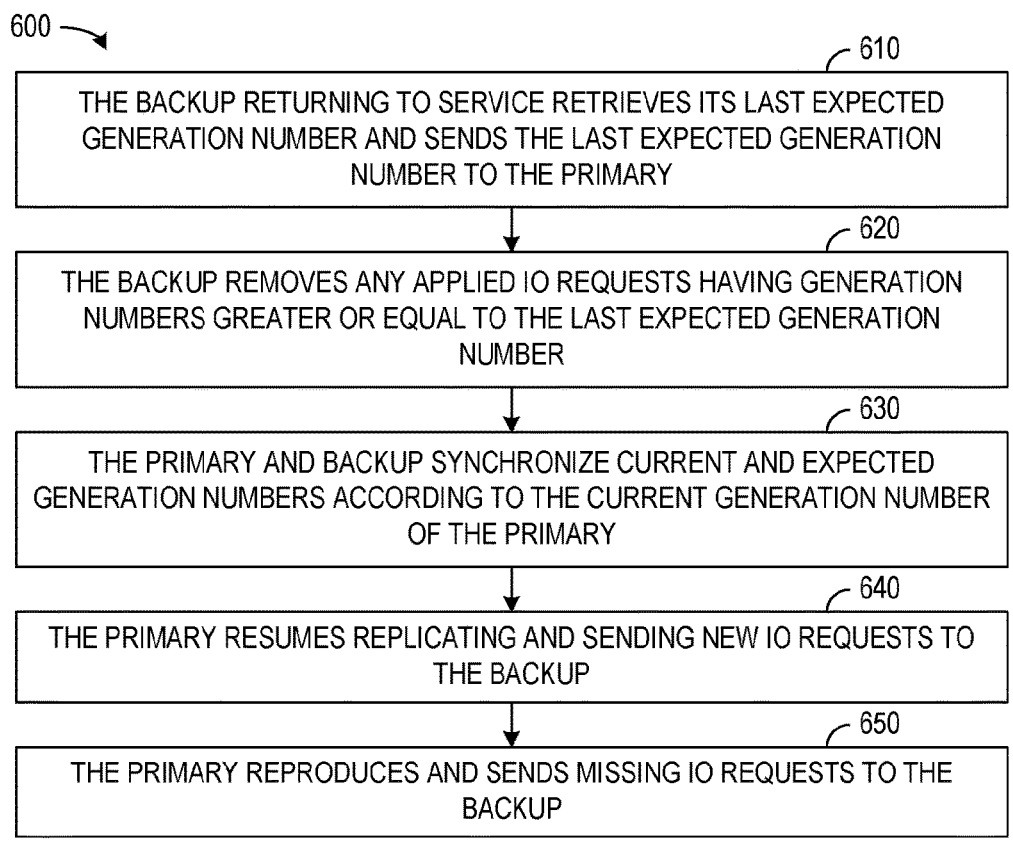
FIG. 6 is a flows diagram of a process for primary and backup storage components to reestablish redundancy.

A backup storage component when returning to service after a failure may communicate with the primary storage component to resume backup service. FIG. 6 is a flow diagram of a process 600 for a primary storage component and a backup storage component to resynchronizes a backup volume with a primary volume. To provide an illustrative example, process 600 is described in the following with reference to storage platform 200 of FIG. 2 in the case where backup storage component 220 failed when platform 200 was in the state illustrated in FIG. 5. In a process block 610, backup storage component 220 retrieves the value of expected generation number 224 from persistent storage and informs primary storage component 210 of the last valid expected generation number 224, which in the example of FIG. 5 was G0+1.

Backup storage component 220 in a process block 620 optionally removes all IO requests that had generation numbers greater than or equal to G0+1. For example, backup storage component 220 may use bitmap 226 or may query data index 227 to find IO requests having generation numbers G0+2 and G0+4 were applied. In performing block 620, backup storage component 220 removes all entries in data index 227 having a key containing generation numbers greater than the expected generation number, e.g., entries corresponding to generation numbers G0+2 and G0+4, and performs any cleanup processes to restore the backup volume 124 to a state before the IO request having the last expected generation number G0+1.

Backup storage component 220, in a process block 630, contacts primary storage component 210 after the cleanup (if process block was performed). At that time, owner 210 generally has a current generation number 212 that is greater than expected generation number 224. For example, current generation number 212 may be G0+200. Primary storage component 210, in process block 630, temporarily blocks IO requests changing volume 122 and tells backup storage component 220 to set generation numbers 222 and 224 to G0+200 and G0+201. IO to volume 122 may be blocked for fractions of a second, e.g., the time needed for primary storage component 210 to block the IO requests, send the current/expected generation numbers, and re-enable replication to ensure any new IO requests will be forwarded to backup storage component 220, before primary storage component 210 unblocks IO requests. Primary storage component 210 and backup storage component 220 then have the same current and expected generation numbers, and primary storage component 210, in a process block 640, may resume replicating new IO requests and sending the new IO requests to backup storage component 220. At this point, backup storage component 220 has not applied IO requests G0+1 to G0+200 to backup volume 124, and in a process block 650, primary storage component 210 can reproduce the missing IO requests and send the reproduced IO request to backup storage component 220 for application to backup volume 124.

Process block 650 may, for example, include backup storage component 220 asking primary storage component 210 to send backup storage component 220 write data belonging to volume 122 and having generation numbers in the range of G0+1 to G0+200 inclusive. Data index 217 has entries indexed by generation numbers of IO requests and mapping to physical storage locations were the data corresponding to the IO request is stored in backend media. Primary storage component 210 can thus reconstruct the IO requests having generation numbers from G0+1 to G0+200 that are still relevant to data in volume 122 and therefore to backup volume 124. (An IO request may not be relevant, for example, if data for the IO request was overwritten in response to a later IO request.) The reproduced IO requests may be sent with a flag or other metadata that distinguishes the reproduced missing IO request from a new IO request. Once all data with generation numbers between G0+1 and G0+200 has been sent to backup storage component 220 from primary storage component 210 and have been applied in backup storage component 220, primary storage component 210 and backup storage component 220 are again in sync, i.e., have been resynchronized.

A resynchronization process can avoid process block 620 (in which the backup storage component 220 deletes IO requests with generation number greater than or equal to its last valid expected generation number before failure) by checking reconstructed IO requests during resynchronization process to determine whether the IO request was already applied. For example, when backup storage receives the reproduced IO requests, backup storage component 220 can check to bitmap 226 or data index 227 and persistent storage 252 to determine whether an identical IO requests was already applied. If so, backup storage component 220 can acknowledge that reproduced IO request without applying it. Alternatively, the backup storage component 220 in process block 640 may ask primary storage component 210 to send backup storage component 220 only the IO requests that backup storage component 220 missed, e.g., G0+1, G0+3, and G0+5 to G0+200.

Volume 122 may have snapshots, when backup storage component 220 returns to service and contacts primary storage component 210. In this case, backup storage component 220 has in its persistent store last valid expected generation number 224 and tells primary storage component 210 this value (in process block 610). Primary storage component 210 pauses IO and tells backup storage component 220 the values of current and expected generation numbers 212 and 214 (in process block 630). Primary storage component 210 also tells backup storage component 220 any generation numbers associated with snapshots between current generation number 212 and the last valid expected generation number of backup storage component 220. Backup storage component 220 sets current and expected generation numbers 222 and 224 to match the owner's values. Backup storage component 220 may then also create each snapshot with matching generation numbers corresponding to the snapshot.

A resynchronization or synchronization process can be used if a new storage component is designated for backup. For example, if an SPU or other storage component is newly assigned to be the backup storage component 220 that backups an existing volume 122, the backup storage component 220 needs to go through a full synchronization process. For that, backup storage component 220 tells primary storage component 210 that backup storage component 220 is ready to receive replicated data. Primary storage component 210 blocks 10 and sets backup storage component 220 to have current and expected generation numbers 222 and 224 according to the value of current generation number 212 of volume 122. Primary storage component 210 unblocks 10 and starts replicating the modification requests targeted at volume 122.

If the backup storage component 220 dies again before a resynchronization process has completed. Backup storage component 220 is not in a synced state. Backup storage component 220 is still in a resynchronizing state. So backup storage component 220 does not (and did not) overwrite the last valid expected generation number in the persistent store of backup storage component 220. In the example of a failure in the state shown in FIG. 5 and subsequent failure before resynchronization was achieved, backup storage component 220 still has G0+1 as expected generation number in its persistent resynchronization information. When backup storage component 220 again comes back up, backup storage component 220 starts getting all data from G0+1 to whatever value current generation number 212 on primary storage component 210 has at that time. This may cause some data that was already sent to the backup storage component 220 to be sent again. Backup storage component 220 can use data index 227 to recognize the duplication and throw away duplicate data.

If owner 210 and backup 220 are in the state shown in FIG. 5 when primary storage component 210 fails, primary storage component 210 remembers has the value (G0+1) of its expected generation number 214 in persistent memory. Backup storage component 220 takes over IO requests to volume 122 using the data of backup volume 124. At that time, based on its value (G0+4) of current generation number 222, backup storage component 220 sets expected generation number 224 to one more than current generation number 222 (G0+5), but storage component 220 can further apply all forward IO requests that where in flight when storage component 210 failed. The new owner 220 is now handling IO locally only and not replicating it, so that current generation number 222 may keep going up. When the failed storage component 210 comes back up, resynchronization process 600 as described above is performed with component 220 as the owner and component 210 as the backup.

Each of modules disclosed herein may include, for example, hardware devices including electronic circuitry for implementing the functionality described herein. In addition or as an alternative, each module may be partly or fully implemented by a processor executing instructions encoded on a machine-readable storage medium.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although particular implementations have been disclosed, these implementations are only examples and should not be taken as limitations. Various adaptations and combinations of features of the implementations disclosed are within the scope of the following claims.

What is claimed is:

1. A process comprising:
for a sequence of requests to write data in a virtual volume owned by a first storage processing unit, the first storage processing unit processing each of the requests by:
assigning to the request to a generation number sequentially from a sequence of generation numbers;
applying the request to first persistent storage associated with the first storage processing unit; and
transmitting the request and the generation number of the request to a second storage processing unit;
for each of the requests the second storage processing unit receives from the first storage processing unit, the second storage processing unit processing the request by:
applying the request to second persistent storage associated with the second storage processing unit; and updating resynchronization data of the second storage processing unit, the resynchronization data distinguishing which generation numbers from the sequence of generation numbers do not correspond to the requests processed by the second storage processing unit.

2. The process of claim 1, wherein in response to the second storage processing unit returning to service after being unavailable, the process further comprises:
the second storage processing unit retrieving the resynchronization data and informing the first storage processing unit of a set of generation numbers for which the second storage processing unit has not process requests; and
the first storage processing unit creating reconstructed requests corresponding to generation numbers in the set, and transmitting the reconstructed requests to the second storage processing unit.

3. The process of claim 1, wherein for each of the requests that the second storage processing unit receives from the first storage processing unit, the second storage processing unit further processes the request by sending an acknowledgement to the first storage processing unit, the acknowledgement indicating that the second processing unit has applied the request.

4. The process of claim 3, further comprising:
the first processing unit maintaining a current generation number indicating the generation number last assigned to one of the requests; and
the first processing unit updating an expected generation number in response to receiving from the second processing unit an acknowledgement corresponding to a prior value of the expected generation number.

5. The process of claim 1, wherein the second processing unit updating the resynchronization data, comprises:
the second processing unit, in response to the generation number of the request being greater than a value of a current generation number kept by the second processing unit, setting the current generation number to the generation number of the request; and
the second processing unit, in response to the generation number of the request matching a value of an expected generation number kept by the second processing unit, changing the value of the expected generation number to a generation number that follows in the sequence of generation numbers and does not correspond to any of the IO requests processed by the second processing unit.

6. The process of claim 1, wherein the resynchronization data comprises:
a current generation number indicating a greatest of the generation numbers of the requests that the second storage processing unit has applied; and
an expected generation number indicating a least of the generation number of the request that the second storage processing unit has not applied.

7. The process of claim 6, wherein the resynchronization data further comprises a bit map containing bits that map to generation numbers and are set or not depending on whether the second storage processing unit has processed the request corresponding to the generation numbers.

8. A storage processing unit comprising:
a persistent memory; and
a processor configured to process a sequence of requests to write data in a virtual volume associated with the storage processing unit, the storage processing unit processing each of the requests by:
assigning to the request to a generation number sequentially from a sequence of generation numbers;
applying the request to first persistent storage associated with the first storage processing unit;
transmitting the request and the generation number of the request to a backup storage component that maintains a backup of the virtual volume;
maintaining in the persistent memory a current generation number indicating the generation number last assigned to one of the requests; and
in response to receiving from the backup storage component an acknowledgement corresponding to a value of an expected generation number in persistent memory, updating in the expected generation number.

9. The storage processing unit of claim 8, wherein the processor is further configured to execute a resynchronization process after recovering from a failed state, the resynchronization process comprising:
accessing values of the current generation number and the expected generation number from the persistent memory;
communicating the values of the current generation number and the expected generation number to the backup storage component;
receiving from the backup storage component a set of reconstructed requests that correspond to generation numbers determined based on the values of the current generation number and the expected generation number from the persistent memory.

10. The storage processing unit of claim 8, wherein the processor is further configured to execute a resynchronization process after the backup storage component recovers from a failed state, the resynchronization process comprising:
receiving from the backup storage component resynchronization data indicating generation numbers corresponding to requests that the backup storage component has not applied;
reconstructing a set of reconstructed requests that the storage processing unit has applied and that correspond to generation numbers of the requests that the backup storage component has not applied; and
transmitting the reconstructed request to the backup storage component.

11. A storage processing unit comprising:
a persistent memory; and
a processor configured to process a sequence of requests to write data in a virtual volume associated with a primary storage component, the storage processing unit processing each of the requests by:
receiving the request and a generation number of the request from the primary storage component, the generation number being from a sequence of generation numbers;
applying the request to persistent storage associated with the storage processing unit;
acknowledging to the primary storage component that the storage processing unit applied the request; and
updating resynchronization data in the persistent memory, the resynchronization data distinguishing which generation numbers from the sequence of generation numbers do not correspond to requests processed by the storage processing unit.

12. The storage processing unit of claim 10, wherein updating the resynchronization data comprises:
in response to the generation number of the request being greater than a value of a current generation number in the persistent memory, setting the current generation number to the generation number of the request; and in response to the generation number of the request matching a value of an expected generation number in the persistent memory, changing the value of the expected generation number to a generation number that follows in the sequence of generation numbers and does not correspond to any of the TO requests processed by the second processing unit.

13. The storage processing unit of claim 12, wherein the processor is further configured to execute a resynchronization process after recovering from a failed state, the resynchronization process comprising:

accessing values of the current generation number and the expected generation number from the persistent memory;

communicating the values of the current generation number and the expected generation number to the second storage processing unit;

receiving from the second storage processing unit a set of reconstructed requests that correspond to generation numbers determined based on the values of the current generation number and the expected generation number from the persistent memory.

* * * * *